(12) United States Patent
Cook et al.

(10) Patent No.: US 6,276,736 B1
(45) Date of Patent: Aug. 21, 2001

(54) STORAGE COMPARTMENT FOR A VEHICLE

(75) Inventors: Charles L. Cook, Thackerville, OK (US); Jeffrey S. Corey, Krum, TX (US); William C. Kahn, Denton, TX (US); Frank H. Schneck, Jr., Corinth, TX (US)

(73) Assignee: Paccar Inc., Bellevue, WA (US)

( * ) Notice: Subject to any disclaimer, the term of this patent is extended or adjusted under 35 U.S.C. 154(b) by 0 days.

(21) Appl. No.: 09/653,795

(22) Filed: Sep. 1, 2000

(51) Int. Cl.$^7$ ...................................................... B60N 3/12
(52) U.S. Cl. .......................................... 296/37.6; 296/37.1
(58) Field of Search .................................... 296/37.6, 37.1

(56) References Cited

U.S. PATENT DOCUMENTS

| | | | |
|---|---|---|---|
| D. 343,597 | 1/1994 | Meryman et al. .................... D12/97 |
| D. 403,653 | 1/1999 | DeShong et al. ................. D12/414.1 |
| 3,558,180 | 1/1971 | Algire ..................................... 296/23 |
| 3,658,201 | 4/1972 | Williams et al. ..................... 214/454 |
| 3,813,735 | * 6/1974 | Thiermann .......................... 296/37.6 |
| 4,103,956 | 8/1978 | Faultstich ............................... 296/10 |
| 4,108,487 | 8/1978 | Spohn ..................................... 296/28 |
| 4,283,083 | 8/1981 | Johnson ............................. 296/24 R |
| 4,351,554 | 9/1982 | Miller ................................ 296/24 R |
| 4,469,364 | 9/1984 | Rafi-Zadeh ......................... 296/37.6 |
| 4,844,528 | * 7/1989 | Johnson .............................. 296/37.1 |
| 4,892,346 | * 1/1990 | Berlin ................................. 296/37.6 |
| 4,913,485 | 4/1990 | Moffatt et al. ....................... 296/190 |
| 4,957,228 | * 9/1990 | Balka ................................. 296/37.1 |
| 5,065,699 | * 11/1991 | Marshall ............................. 296/37.6 |
| 5,083,834 | 1/1992 | Moffatt et al. ....................... 296/190 |
| 5,421,645 | * 6/1995 | Young ................................. 296/37.6 |
| 5,738,262 | * 4/1998 | Andrini .............................. 296/37.1 |

FOREIGN PATENT DOCUMENTS 0-245 748 * 5/1987 (EP) .................................... 296/37.1

* cited by examiner

Primary Examiner—Joseph D. Pape
Assistant Examiner—Kiran B. Patel
(74) Attorney, Agent, or Firm—Sidley Austin Brown & Wood

(57) ABSTRACT

A storage compartment for a vehicle capable of being coupled to a trailer via a coupling. When in a coupled state, a space is defined between the trailer and the vehicle. The space includes a swing clearance area for the trailer. The swing clearance area is bounded by a front portion of the trailer, and an arc traversed by the front portion of the trailer, about the coupling, within the space when the vehicle and the trailer are combined and in transition between a straight configuration and a turning configuration. The storage compartment is adapted to attach to the vehicle within the space such that at least a portion of the storage compartment extends rearward beyond a forwardmost point on the arc, but without extending into the swing clearance area.

25 Claims, 8 Drawing Sheets

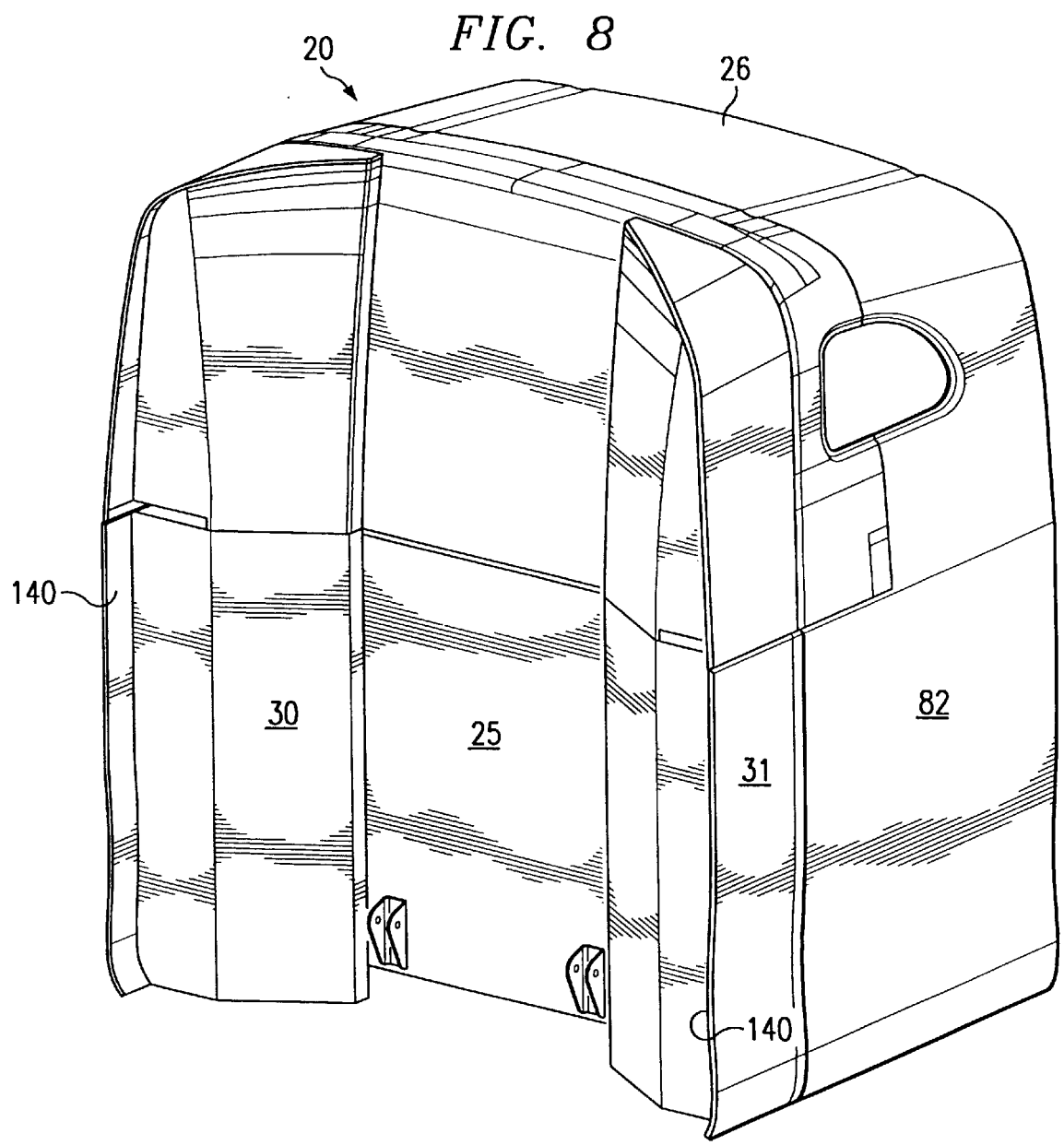

STORAGE COMPARTMENT FOR A VEHICLE

TECHNICAL FIELD OF THE INVENTION

The present invention relates to storage compartments for use on vehicles designed for hauling trailers. In particular, the present invention relates to storage structures that are located within a space between a vehicle and a trailer when in a coupled state, but which do not interfere with the turning operation of the vehicle-trailer combination.

BACKGROUND OF THE INVENTION

It is well known to provide vehicles, including trucks, designed for hauling trailers with storage compartments for storing tools, tie-downs, tarps, supplies, personal possessions, and other items which are to be secured (e.g., secure against loss or theft) and/or protected from the weather. A storage compartment may be an integral, i.e., built-in feature of the truck's operator compartment, or it may be an accessory item which is mounted to the exterior of the operator compartment or onto the frame of the truck.

Generally speaking, the more storage compartments on a truck the better, as this gives the operator more room for storing items in a secure and/or weather-resistant manner. Current truck manufacturers seek to maximize the volume of storage compartments on current vehicles, consistent with the other uses of the operator compartment, such as sleeping. However, the amount of storage compartments on trucks designed for hauling semi-trailers is currently limited by several factors, for example: space limitations inside the operator compartment, swing clearance requirements behind the operator compartment, and overall vehicle length restrictions. Each of these factors is further discussed below.

Trucks used for hauling semi-trailers in a tractor-trailer combination are typically equipped with a semi-trailer attachment apparatus known as a fifth wheel. Mounted on the rear frame of the truck, the fifth wheel receives and secures a kingpin mounted on the underside of the semi-trailer to provide a pivotal connection between the truck and semi-trailer. This pivotal articulation allows the tractor-trailer combination to be much more maneuverable than a non-articulated vehicle of similar length. However, when the tractor-trailer combination is in a turning configuration, front corners of the semi-trailer, for a typical rectangular-shaped trailer, pivot about the kingpin center, causing one or the other of the corners, depending on a turning direction, to move forward along an arc toward the back of the truck operator compartment (i.e., day cab without a sleeper or cab with sleeper).

It is known to designate the generally D-shaped area defined by an arc, traveled by a front corner of the semi-trailer when the tractor-trailer combination turns, and the flat leading edge of the semi-trailer as a "swing clearance area." The permanent mounting of equipment or truck components within the swing-clearance area is generally prohibited to avoid interference between the operator compartment and the trailer during turns.

For a tractor-trailer combination, there is typically a volume of free space between the operator compartment and the forward boundary of the swing clearance area. It is known to locate items such as exhaust pipes, air intake pipes, and hose or chain racks in this free space. However, those items do not provide secure, weatherproof storage of articles within this free space. It is also known to position flat rectangular containers against the back of the operator compartment. But such containers do not extend rearward beyond the swing clearance area to use the previously underutilized free space being rearwardly beyond a forwardmost point of the swing clearance area.

Hence, a need exists for a storage cabinet that better uses the free space between the operator compartment and the semi-trailer, but without compromising the swing clearance area.

Some states and countries have laws or regulations that restrict the overall length of a vehicle, which may limit the length of a tractor-trailer combination intended to operate in such states or countries. Because the primary purpose of a tractor-trailer combination is to haul large loads of goods, it may be desirable to maximize the size of the semi-trailer to accommodate larger loads. But, maximization of a trailer length results in a corresponding decrease in the length of the operator compartment under such length restrictions. Reducing the size of the operator compartment adversely affects the effective amount of secure, weatherproof storage volume enclosed within the operator compartment.

Therefore, a need exists for a storage compartment that provides all-purpose storage aft of the operator compartment of a vehicle without interfering with the swing clearance area needed when the vehicle is operably combined with a trailer and without increasing the overall length of a vehicle-trailer combination.

SUMMARY OF THE INVENTION

Many of the needs outlined above are addressed by the present invention hereof. It is an object of the present invention to provide a secure and/or weatherproof storage compartment in a free space between the operator compartment and the semi-trailer without compromising the swing clearance area.

It is another object of the present invention to meet both objectives of maximizing the semi-trailer size and maximizing the operator compartment storage without increasing the overall length of a tractor-trailer combination.

In accordance with the present invention, a storage compartment for a vehicle is provided. The vehicle is adapted to be coupled to a trailer via a coupling such that when in a coupled state, a space is defined between the trailer and the vehicle. The space includes a swing clearance area for the trailer. The swing clearance area is bounded by a front portion of the trailer, and an arc traversed by the front portion of the trailer, about the coupling, within the space when the vehicle and the trailer are combined and in transition between a straight configuration and a turning configuration. The storage compartment is adapted to attach to or integrally extend from the vehicle within the space such that at least a portion of the storage compartment extends rearward beyond a forwardmost point on the arc, but without extending into the swing clearance area.

BRIEF DESCRIPTION OF THE DRAWINGS

Other objects and advantages of the invention will become apparent upon reading the following detailed description and upon reference to the accompanying drawings in which:

FIG. 8 is a perspective view of a tractor having storage compartments with replaceable crush zones in accordance with a sixth embodiment of the present invention.

DETAILED DESCRIPTION OF THE INVENTION

Figure 1:
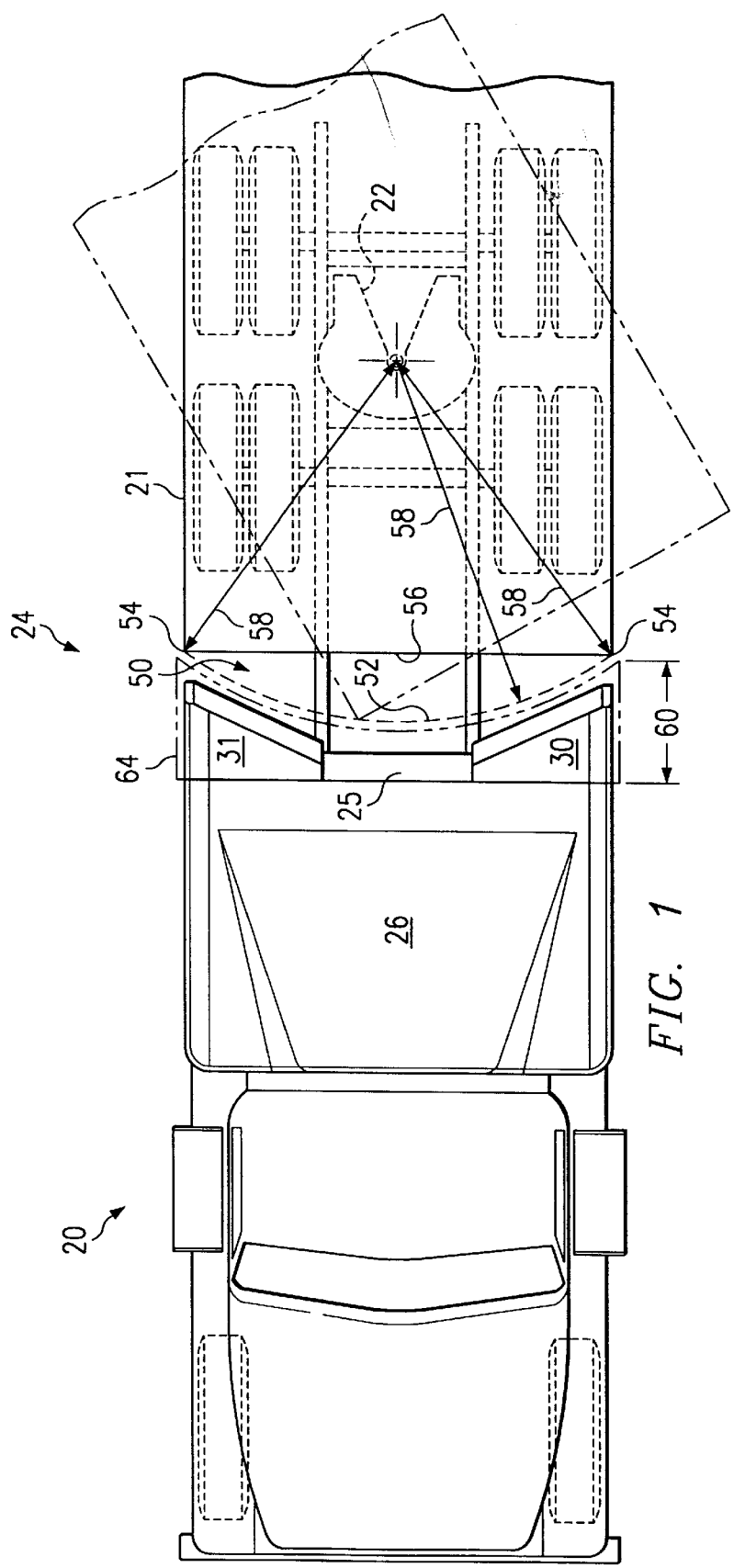
FIG. 1 is a top view of a tractor-trailer combination that includes a first embodiment of the present invention installed thereupon.

Referring now to the drawings, wherein like reference numbers are used to designate like elements throughout the various views, several embodiments of the present invention are further described. FIG. 1 shows a truck 20 connected to a semi-trailer 21 by a coupling 22 to form a tractor-trailer combination 24. The coupling 22 shown here is a fifth-wheel coupling, but the present invention also applies to vehicles with other possible couplings (e.g., light duty truck with a goose-neck coupling). A rear panel 25 defines the back of the truck operator compartment 26. Storage cabinets 30, 31 according to a first embodiment of the present invention are attached to the rear panel 25 of the operator compartment 26. The operator compartment 26 in FIG. 1 is a truck cab having a sleeper extending rearward therefrom. In other possible embodiments the truck operator compartment may be a cab only, which is also called a day cab. For purposes of this description, the term "operator compartment" is used to refer to the sleeper for a truck having a sleeper connected to the cab, or to refer to the cab for a truck having only a cab (no sleeper).

FIG. 1 also shows the swing clearance area 50 required by a typical tractor-trailer combination 24 using a fifth wheel 22. The swing clearance area 50 is typically defined by an arc 52 traveled by the front corners 54 of the semi-trailer 21 about the fifth wheel 22 (i.e., as when the tractor-trailer combination 24 is in a turning configuration, which is illustrated in part by the broken line showing of semi-trailer 21 in FIG. 1). Often the swing clearance area 50 will be D-shaped because most conventional semi-trailers are rectangular having a flat leading edge 56 and two front corners 54 at an equal radial distance 58 from the fifth wheel 22. When a tractor-trailer combination 24 is in motion, the swing clearance area 50 typically must be kept clear of obstructions to allow the tractor-trailer combination to turn a corner without having interference between the semi-trailer 21 and the operator compartment 26. Hence, there must be enough free space (denoted by reference number 60) between the semi-trailer 21 and the operator compartment 26 to provide the swing clearance area 50.

It is known to locate miscellaneous items such as exhaust pipes, air intake pipes, and hose or chain racks in the free space 60 between the operator compartment 26 and the semi-trailer 21. It is also known to position flat rectangular racks against the back of the operator compartment 26. However, those items do not provide effective and efficient storage of items within an underutilized free space (denoted by dashed area 64) being rearward of the operator compartment 26 and rearward of a forwardmost point 62 of the swing clearance area 50, but being outside of the swing clearance area. An important aspect of the present invention is to make use of this previously underutilized free space 64 to increase the effective storage capacity of the truck 20.

Figure 2:
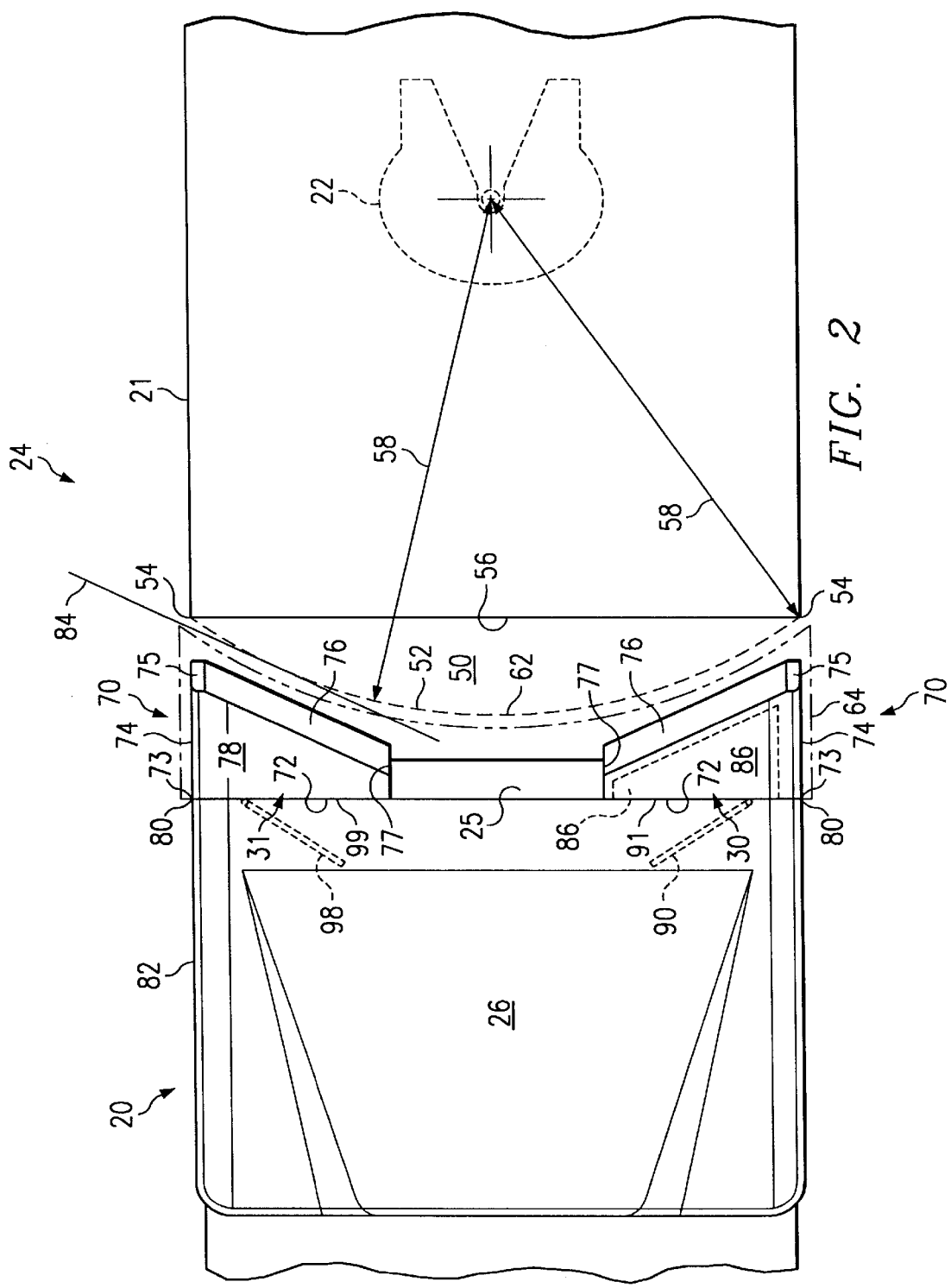
FIG. 2 is an enlarged top view of the first embodiment shown in FIG. 1.
Figure 3:
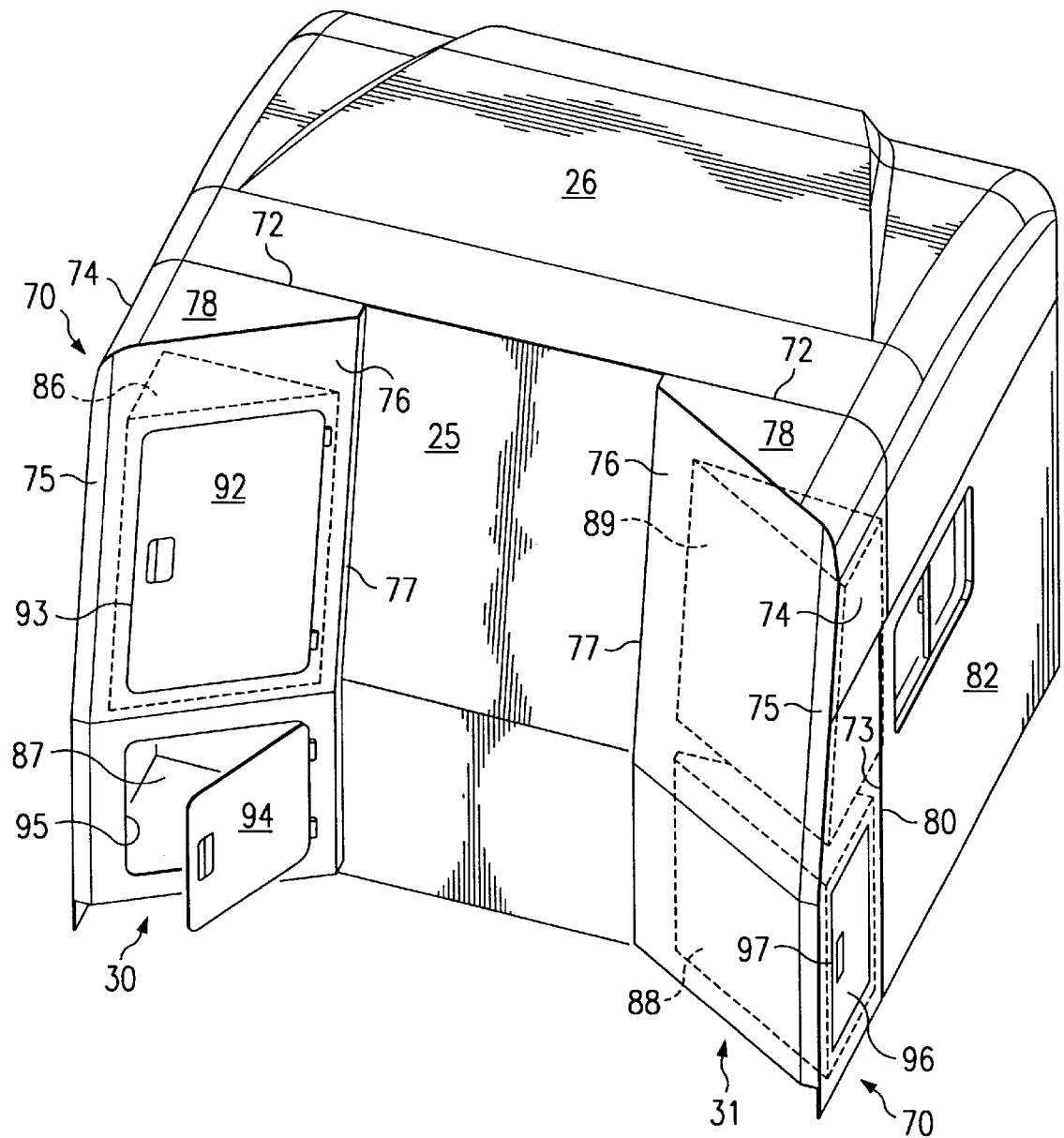
FIG. 3 is a rear perspective view of the first embodiment shown in FIGS. 1 and 2.

To illustrate more details of the first embodiment, FIG. 2 is an enlarged top view of the first embodiment shown in FIG. 1, and FIG. 3 is a rear perspective view of the first embodiment showing the operator compartment 26 (a sleeper in this embodiment) detached from the truck 20 and having storage cabinets 30, 31 attached thereto. The view in FIG. 3 best illustrates the generally prism shape of the storage cabinets 30, 31 selected for better use of the available free space 64 while not occupying the swing clearance area 50.

The storage compartment shape is defined by a three-dimensional polygonal body 70 having a first side 72, a second side 74, and a third side 76. The body 70 has a generally triangular cross-section 78 at every horizontal plane along the vertical axis of the body. However, the size and angles of the generally triangular cross-sections 78 may vary along the vertical axis. In other words, slicing the body 70 perpendicular to the vertical axis near the bottom may provide a different triangular cross-section shape and size than slicing the body near the middle or top. But, the generally triangular cross-sections 70 may also be the same size and shape along the entire vertical axis of the body 70.

As shown in FIGS. 2 and 3, the first side 72 is generally parallel to the contour of the rear panel 25. The first side 72 has a first edge 73 that is located proximate to and generally parallel with an outer edge 80 of the rear panel 25. The first side 72 is completely flush with the rear panel 25. The rear panel contour may vary depending on the year, make, and model of the truck 20. Hence, the rear panel 25 may not be flat nor vertical. The rear panel 25 may have a curved or sloped contour, which the first side 72 may follow. In other embodiments, the first side 72 may not be completely flush with the rear panel 25, and the first side may not be parallel with the contour the rear panel. But rather, the first side 72 may be merely proximate to the rear panel 25.

The second side 74 joins the first side 72 along the first edge 73. The second side 74 extends generally rearward to a second edge 75. The second edge 75 is located rearward beyond the forwardmost point 62 of the swing clearance area 50. Another important aspect of the present invention is that the second edge 75 extends beyond the forwardmost point 62 such that a storage compartment (30 or 31) resides within the previously underutilized free space 64 to provide additional storage for articles therein.

The second side 74 is substantially aligned with a side panel 82 of the operator compartment 26. In other words, the second side 74 follows the contour of the side panel 82 of the operator compartment 26 providing an aesthetically desirable appearance, as well as enhanced aerodynamics. In other embodiments (see FIG. 5), the second side 74 may not be aligned with the side panel 82 of the operator compartment 26.

The third side 76 joins the second side 74 along the second edge 75. Also, the third side 76 joins the first side 72 at a third edge 77 to complete the generally triangular cross-section 78 of the polygonal body 70. The third edge 77 is proximate to and generally parallel to the rear panel 25 because the first side 72 is completely flush with the rear panel 25. In other embodiments, the third edge 77 may not be parallel with the contour the rear panel 25, but rather the third edge may be merely proximate to the rear panel.

As shown in FIG. 2, the third side 76 is substantially parallel to a tangent 84 on the arc 52 that defines the forward boundary of the swing clearance area 50. However, the third side 76 may be a generally curved surface. Specifically, the third side 76 may follow the contour of the arc 52 that defines the forward boundary of the swing clearance area 50 (see FIG. 6) to maximize the use of the previously underutilized free space 64.

An embodiment of the storage cabinets 30 and 31 may be adapted to attach to an existing truck operator compartment 26 by a variety of means, including but not limited to: adhesive, screws, bolts, rivets, hinge and latch combination, or welded brackets. Also, the storage cabinets 30 and 31 may be formed from various materials, including but not limited to: plastic, fiberglass composite, carbon-fiber composite, kevlar composite, wood, water-resistant fabric, steel, and aluminum. Moreover, the storage cabinets 30 and 31 may be formed as a single, integral unit or individual, separate components.

FIGS. 2 and 3 also show multiple storage compartments 86, 87, 88, 89 and access doors 90, 92, 94, 96, 98 in storage cabinets 30, 31. An access door may be in any side (i.e., top, bottom, first 72, second 74, or third side 76). The access doors 90, 92, 94, 96, respectively, provide access openings 91, 93, 95, 97, 99 to the storage compartments 86, 87, 88, 89. FIG. 2 shows an access door 90 located on the first side 72 being accessible from within the sleeper 26 and providing an access opening 91 to the storage compartment 86, which effectively increases the useful volume within the sleeper 26 by using the previously underutilized free space 64. FIG. 3 shows another access door 92 located on the third side 76 being flush mounted along the same surface as the third side. This access door 92 provides an access opening 93 to the storage compartment 86, and thus making the storage compartment 86 further accessible from outside the truck 20. Also shown in FIG. 3, yet another storage compartment 87 is located within the driver-side storage cabinet 30 and below the upper storage compartment 86. Access door 94 (also located on the third side 76) provides an access opening 95 to the lower storage compartment 87. The upper and lower storage compartments 86, 87 are separate, enclosed volumes within the storage cabinet 30. However, the upper and lower storage compartments 86, 87 may be open and contiguous. FIG. 3 further shows a storage compartment 88 located in the lower portion of the passenger-side storage compartment 31. An access door 96 located on the second side 74 is flush mounted along the same plane as the second side and the sleeper side panel 82. The access door 96 covers an access opening 97 to the storage compartment 88, and thus allows accessibility from the side of the truck 20.

Despite the illustrated examples, each storage cabinet 30, 31 may have one storage compartment, one access door, and one access opening. As discussed above, however, other possible embodiments may have the storage compartment divided into multiple storage compartments having multiple access doors and access openings. Such multiple access doors may be located on various sides of the storage compartment (i.e., first 72, second 74, and third 76 sides) and in any combination thereof. Also, an embodiment may have multiple access doors for a single storage compartment. For example, FIGS. 2 and 3 show an embodiment having a storage cabinet 30 with access doors 90, 92 on both the first 72 and third 76 sides making the storage compartment 86 accessible from inside or outside the operator compartment 26.

An access door may be formed from various materials, including but not limited to: plastic, fiberglass composite, carbon-fiber composite, kevlar composite, wood, water-resistant fabric, steel, and aluminum. An access door also may have various shapes and sizes, including but not limited to having a generally: flat face, curved face, face following the contour of a side, rectangular shape, square shape, triangular shape, and oval shape. Furthermore, an access door may have various opening and fastening means, including but not limited to a: hinge, sliding door, rotating door, hook and latch fastener, magnetic, spring bias, door knob, lock, and latch.

Figure 4:
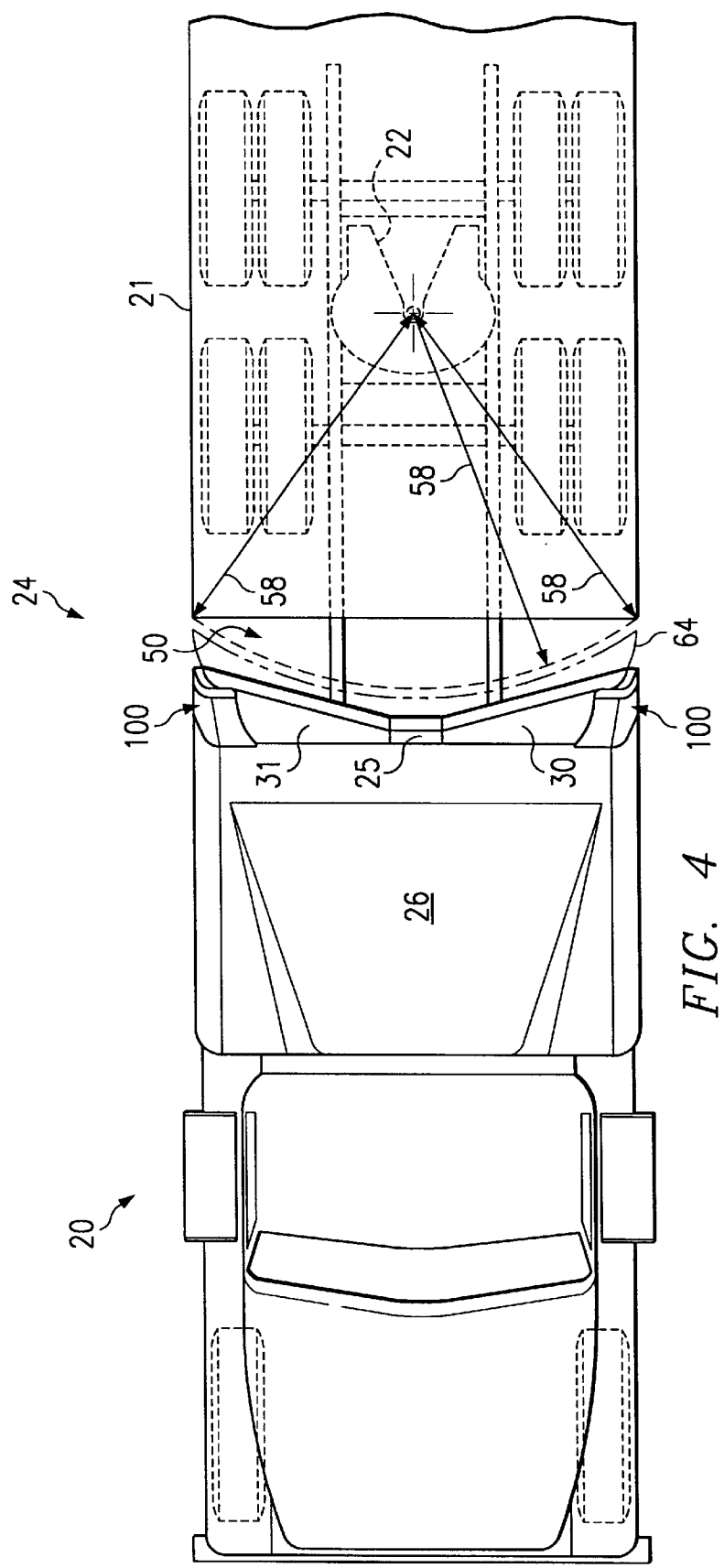
FIG. 4 is a top view of a tractor-trailer combination that includes a second embodiment of the present invention installed on a truck that already has aerodynamic extensions.

FIG. 4 is a top view of a truck 20 having aerodynamic extensions 100 protruding rearward therefrom. A second embodiment shown in FIG. 4 has storage compartments 30, 31 adapted to fit on the rear panel 25 of a sleeper 26 that has aerodynamic extensions 100 installed thereon. Hence, the storage compartments 30, 31 may be adapted for installation on a truck 20 within the previously underutilized free space 64 between the rear panel 25 and the swing clearance area 50, while also allowing the existing aerodynamic extensions 100 to remain useful. If a truck 20 does not already have aerodynamic extensions 100, an embodiment of the present invention may have the second side 74 of a storage compartment shaped like and also acting as aerodynamic extensions 100, as shown in FIGS. 1–3 and 5.

Figure 5:
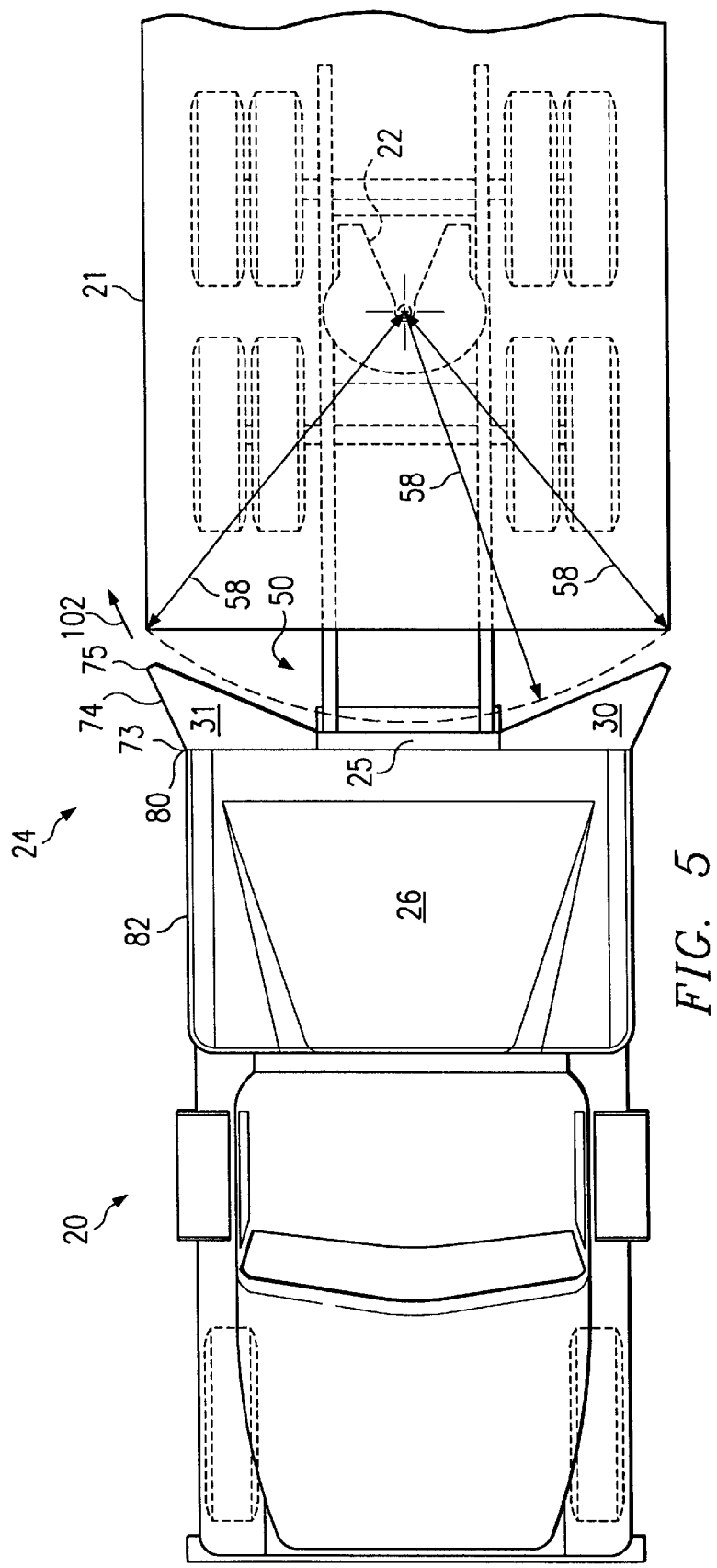
FIG. 5 is a top view of a tractor-trailer combination that includes a third embodiment of the present invention.

The second edge 75 of the embodiment shown in FIGS. 1–3 is substantially aligned with the front corners 54 of the attached semi-trailer 21. But the semi-trailer 21 may not be the same width as operator compartment 26, which may result in the need for a third embodiment having the second edge 75 aligned with a front corner 54 of the trailer 21 without the second side 74 being aligned with the side panel 82 of the operator compartment 26. FIG. 5 provides an example of such embodiment. The direction from the first edge 73 to the second edge 75 is a generally outward direction 102 away from the operator compartment 26. The second side 74 need not be a flat plane because it may have a variety of shapes and contours for aesthetic design or for enhanced aerodynamics. Hence, there may be embodiments where it is preferable that the second side 74 is not aligned with the side panel 82 of the operator compartment 26.

Figure 6:
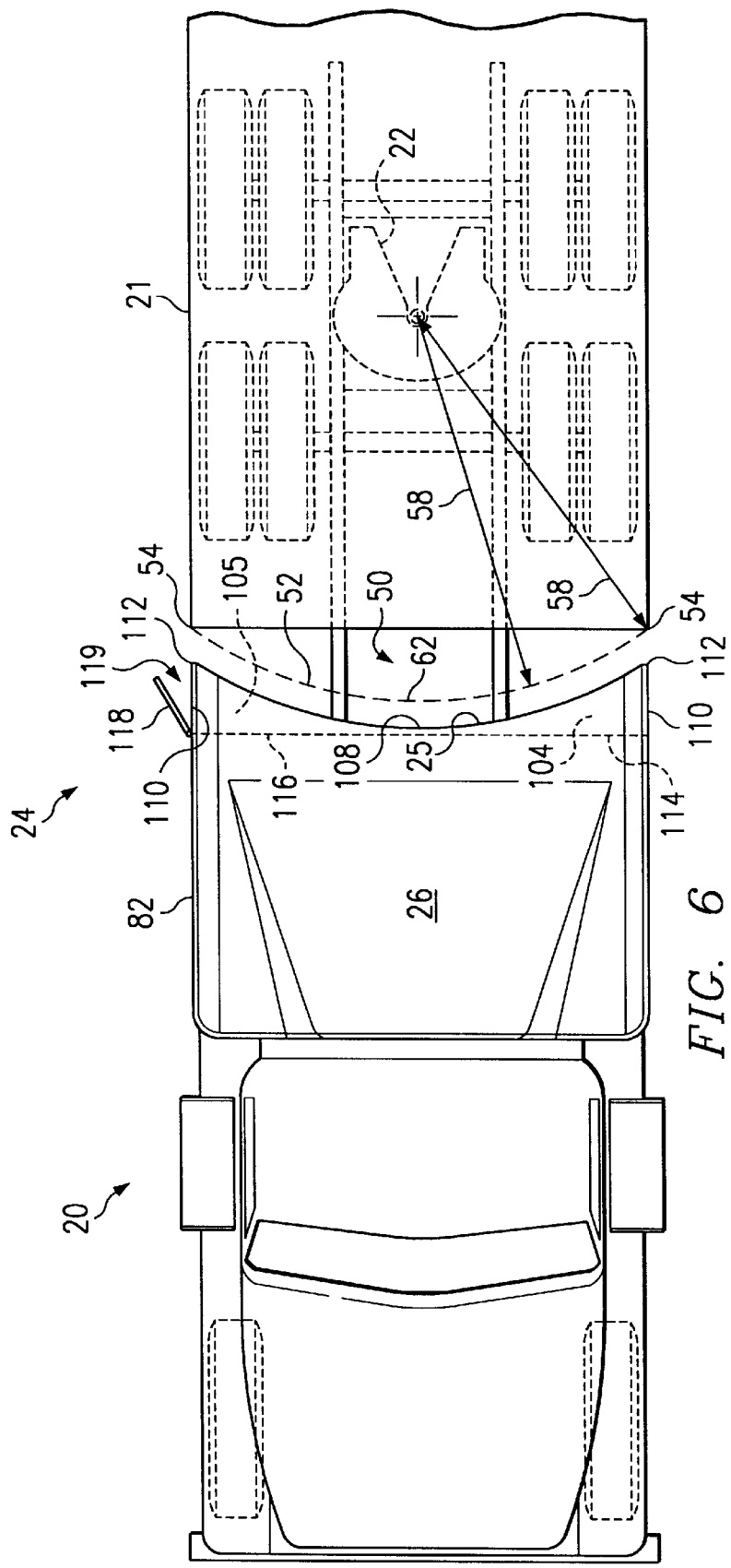
FIG. 6 is a top view of a tractor-trailer combination that includes a fourth embodiment of the present invention.

FIG. 6 is a top view of a tractor-trailer combination 24 having storage compartments 104, 105 integrally formed in the operator compartment 26 according to a fourth embodiment of the present invention. The rear panel 25 of the operator compartment 26 has a forwardmost extent 108 located forward of the swing clearance area 50. The side panel 82 of the operator compartment 26 has a side portion 110 that extends longitudinally aft of the forwardmost extent 108 of the rear panel 25 to an edge 112. The side portion 110 and the rear panel 25 join at the edge 112, which is located longitudinally aft of the forwardmost point 62 of the swing clearance area 50, but not within the swing clearance area. The storage compartments 104, 105 are defined by the rear panel 25 and the side portions 110. At least part of the storage compartments 104, 105 is longitudinally aft of the forwardmost point 62 of the swing clearance area 50, but not extending within the swing clearance area 50. In other words a storage compartment (104 or 105) is a volume defined by the rear panel 25 and the side portion 110 that extends into the previously underutilized free space, but without occupying the swing clearance area 50.

The storage compartment 104 (on driver side in FIG. 6) is open and accessible from within the operator compartment 26, but not accessible from outside the truck 20. A shelf 114 is attached to the operator compartment 26 and within the storage compartment 104. In other embodiments there may be multiple shelves within the storage compartment 104. The storage compartment 105 (on passenger side in FIG. 6) has a wall 116 enclosing and separating the storage compartment from the remaining inside volume of the operator compartment 26. An access door 118 in the side portion 110 provides an access opening 119 to the storage compartment 105 from outside the truck 20. Hence, the storage compartment 105 is only accessible from outside the truck 20. In other embodiments, the storage compartment 105 may be accessible from outside of the truck 20 as well as from within the operator compartment 26 by having multiple access doors. Another embodiment may have only part of the storage compartment 105 enclosed and separated from the remaining inside volume of the operator compartment 26, while having the remainder of the storage compartment open to the operator compartment. Yet another embodiment may have the storage compartment 105 divided into multiple compartments. In the embodiment of FIG. 6, the rear panel 25, and hence the storage compartments 104, 105, follows the contour of the arc 52 that forms the forward boundary of the swing clearance area 50. Hence, the FIG. 6 embodiment maximizes the secure, weatherproof storage capacity of the operator compartment 26 within the previously underutilized free space between the operator compartment and the swing clearance area 50. Other embodiments of the integral storage compartments 104, 105 may have a portion of the rear panel 25 parallel to a tangent of the arc 52. Still another embodiment may have the side portion 110 extending in an outward direction away from the operator compartment 26, and not aligned with the sleeper side panel 82, to accommodate a semi-trailer 21 being wider than the operator compartment. Also, the side portion 110 may have various contours for aesthetic or aerodynamic purposes.

Figure 7:
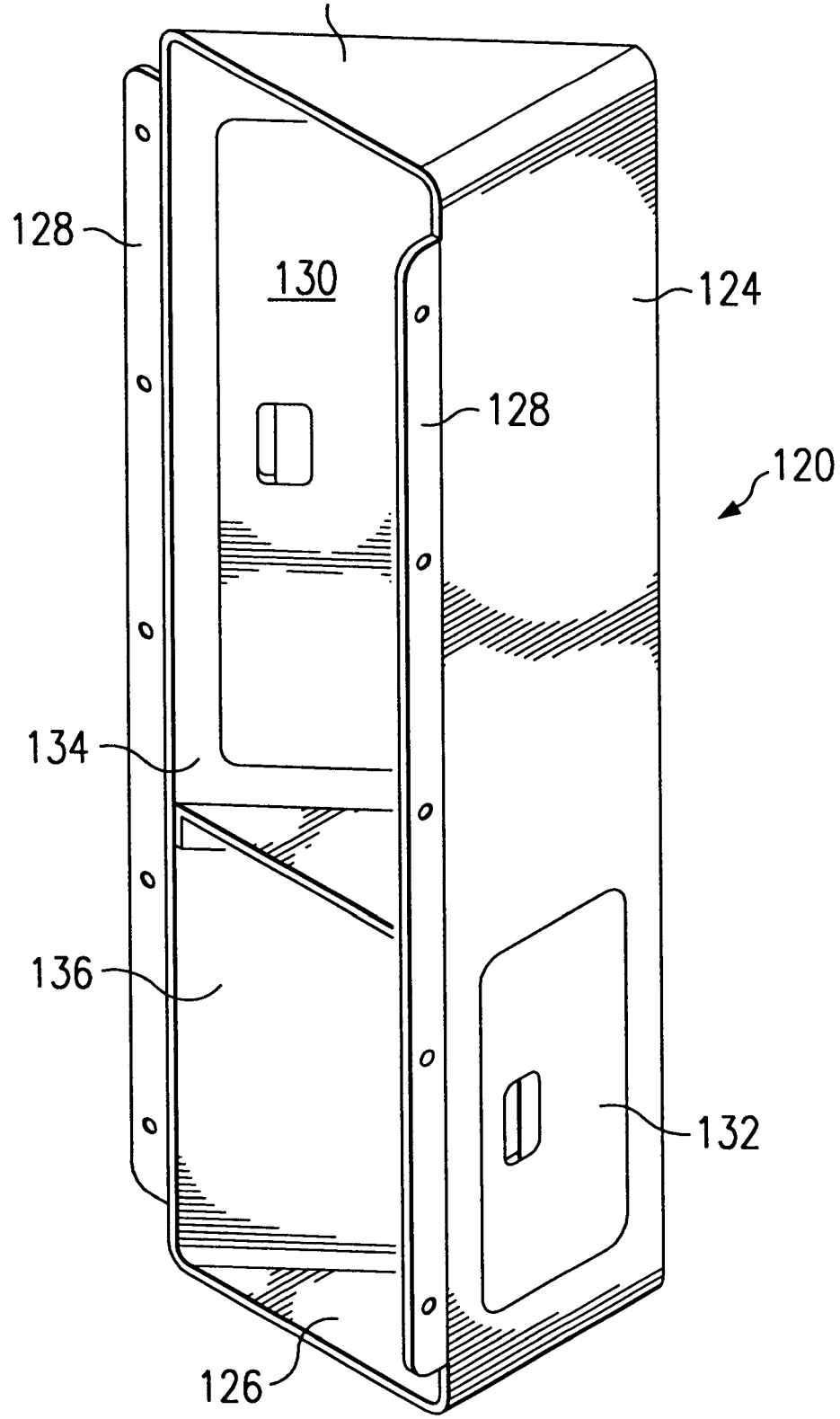
FIG. 7 is a perspective view of a storage compartment in accordance with a fifth embodiment of the present invention.

FIG. 7 shows a storage compartment 120 according to a fifth embodiment of the present invention. The storage compartment 120 has first and second major sides 122, 124, and an open side 126. The storage compartment is adapted to attach on a rear panel of a vehicle operator compartment (not shown) using the flanges 128. Other means of attachment may be used as well (see discussion above). When operably installed, the rear panel of the vehicle covers the open side 126 so that the storage compartment 120 is substantially enclosed. The storage compartment 120 has access doors 130 and 132 to provide accessibility to interior compartments 134 and 136, respectively, formed within the storage compartment 120. Other access openings or access doors also may be formed in the rear panel of the vehicle corresponding to the open side 126, and thus providing access to interior compartments 134, 136 from inside the vehicle. The location and size of the open side 126 formed in the storage compartment 120 may vary.

FIG. 8 a tractor 20 with storage compartments 30, 31 according to a sixth embodiment of the present invention. The storage compartments 30, 31 have a replaceable crush zone 140. The crush zone 140 shown in this example comprises a rubber fin extending rearward from the storage cabinets 30, 31. If a trailer jackknifes, the trailer may contact one of the storage compartments 30 or 31. The crush zones 140 can be a flexible member, such as the rubber crush zone shown in FIG. 8, that can deflect and absorb some of the impact of a trailer during a jackknife and then substantially spring back to its original shape after deflection. Another variation of the crush zone may be a replaceable member (e.g., urethane with a foam insert) that will crush and absorb some or all of the impact force during a jackknife. Hence, the crush zone can be replaced when damaged rather than replacing the entire storage compartment. Thus, one purpose of the crush zone 140 is to protect the storage compartments 30, 31 and the sleeper 26 from damage during minor jackknifes. Another possible purpose of the crush zone 140 is to provide an aerodynamic extension of the storage compartments 30, 31. The crush zones described here also can be applied to any embodiment of the present invention.

It will be appreciated by those skilled in the art having the benefit of this disclosure that this invention provides a storage compartment for using the previously underutilized free space between the rear panel of a truck operator compartment and a swing clearance area for a trailer attached by a fifth wheel. To this end, the present invention is not limited to the tractor/semi-trailer combinations shown in the example embodiments. Rather, the present invention has equal applicability to any vehicle-trailer relationship, wherein the trailer of such relationship moves within a swing clearance area relative to the vehicle. It should be understood that the drawings and detailed description herein are to be regarded in an illustrative rather than a restrictive sense, and are not intended to limit the invention to the particular forms disclosed. On the contrary, the invention includes any further modifications, changes, rearrangements, substitutions, alternatives, design choices, and embodiments apparent to those of ordinary skill in the art without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. A storage compartment for a vehicle connectable to a trailer via a coupling such that when in a coupled state, a space is defined between said trailer and said vehicle, said space including a swing clearance area for said trailer, wherein said swing clearance area is bounded by a front portion of said trailer and an arc, said arc being operatively defined by a range of motion of said front portion of said trailer, about said coupling, within said space when said vehicle and said trailer are combined and operatively transition through a relative turning motion, said storage compartment extending rearward from said vehicle within said space when operatively installed on said vehicle, such that at least a portion of said storage compartment extends rearward beyond a forwardmost point of said arc but said storage compartment remains outside of said swing clearance area.

2. A storage compartment in accordance with claim 1, wherein said storage compartment is substantially enclosed when installed on said vehicle.

3. A storage compartment in accordance with claim 2, wherein said storage compartment has a door for accessing an interior of said storage compartment.

4. A storage compartment in accordance with claim 3, wherein said storage compartment is weatherproof when said door is closed.

5. A storage compartment in accordance with claim 3, wherein said door is located within an interior of said vehicle for accessing an interior of said storage compartment from within said vehicle.

6. A storage compartment in accordance with claim 3, wherein said door is located on an exterior of said storage compartment for accessing an interior of said storage compartment from outside of said vehicle.

7. A storage compartment in accordance with claim 1, wherein said storage compartment is a three-dimensional polygonal body having walls that define a storage space within said storage compartment.

8. A storage compartment in accordance with claim 7, wherein said storage compartment has a generally triangular transverse cross-section.

9. A storage compartment in accordance with claim 8, wherein said storage compartment comprises a first side, a second side, and a third side, said first side being generally parallel to a contour of a rear panel of said vehicle, and said second side being substantially aligned with a contour of an outside vehicle side panel.

10. A storage compartment in accordance with claim 9, wherein said third side substantially follows a contour of at least a portion of said arc.

11. A storage compartment in accordance with claim 9, wherein said third side is generally parallel to a tangent of said arc.

12. A storage compartment in accordance with claim 1, wherein a side of said storage compartment is formed to be an aerodynamic extension for said vehicle.

13. A storage compartment in accordance with claim 1, wherein an interior of said storage compartment is divided into at least two portions.

14. A storage compartment in accordance with claim 1, wherein said storage compartment is integrally formed on a rear panel of said vehicle.

15. A storage compartment in accordance with claim 1, wherein said storage compartment has an open side, wherein said open side mates with a rear panel of said vehicle when said storage compartment is operatively installed on said vehicle.

16. A storage compartment in accordance with claim 1, wherein said storage compartment has a crush zone extending rearward therefrom.

17. A vehicle having a coupling to operatively receive a trailer, and when in a coupled state, a space is defined between said trailer and said vehicle, said space including a swing clearance area for said trailer, wherein said swing clearance area is bounded by a front portion of said trailer and an arc, said arc being operably defined by a range of motion of said front portion of said trailer, about said coupling, within said space when said vehicle and said trailer are combined and operatively transition through a relative turning motion, said vehicle comprising:

a storage compartment positioned within said space such that at least a portion of said storage compartment extends rearward beyond a forwardmost point on said arc, nearest the coupled vehicle, but said storage compartment remains outside of said swing clearance area.

18. A vehicle in accordance with claim 17, further comprising a second storage compartment, said second storage compartment being adapted to attach to said vehicle within said space such that at least a portion of said second storage compartment extends rearward beyond a forwardmost point on said arc but without extending into said swing clearance area, and wherein one of said storage compartments is operably mounted on a driver side of said vehicle and another of said storage compartments is operably mounted on a passenger side of said vehicle.

19. A storage compartment for a vehicle connectable to a trailer via a coupling such that when in a coupled state, a space is defined between said trailer and said vehicle, said space including a swing clearance area for said trailer, wherein said swing clearance area is bounded by a front portion of said trailer and an arc, said arc being operatively defined by a range of motion of said front portion of said trailer, about said coupling, within said space when said vehicle and said trailer are combined and operatively transition through a relative turning motion, said storage compartment comprising:

a three-dimensional polygonal body defining a container of said storage compartment, said three-dimensional polygonal body having a first side, a second side, and a third side;

said first side being generally parallel to a contour of a rear panel of said vehicle;

said second side extending rearward from a position proximate to said rear panel to a position rearward of a forwardmost point of said swing clearance area; and said third side being adjacent to said swing clearance area, wherein said storage compartment remains outside of said swing clearance area.

20. A storage compartment in accordance with claim 19, wherein said third side follows a contour of said arc.

21. A storage compartment in accordance with claim 19, wherein said third side is generally parallel with a tangent of said arc.

22. A storage compartment in accordance with claim 19, wherein said storage compartment has a crush zone extending rearward therefrom.

23. A vehicle having a coupling to operatively receive a trailer, and when in a coupled state, a space is defined between said trailer and said vehicle, said space including a swing clearance area for said trailer, wherein said swing clearance area is bounded by a front portion of said trailer and an arc, said arc being operably defined by a range of motion of said front portion of said trailer, about said coupling, within said space when said vehicle and said trailer are combined and operatively transition through a relative turning motion, said vehicle comprising:

a storage compartment positioned within said space, said storage compartment being a three-dimensional polygonal body;

said three-dimensional polygonal body having a first side, a second side, and a third side;

said first side being generally parallel to a contour of a rear panel of said vehicle;

said second side extending rearward from a position proximate to said rear panel to a position rearward of a forwardmost point of said swing clearance area; and said third side being adjacent to said swing clearance area, wherein said storage compartment remains outside of said swing clearance area.

24. A vehicle in accordance with claim 23, wherein said third side follows a contour of said arc.

25. A vehicle in accordance with claim 23, wherein said third side is generally parallel with a tangent of said arc.

* * * * *